(12) United States Patent
Hryniewicki

(10) Patent No.: US 8,516,011 B2
(45) Date of Patent: Aug. 20, 2013

(54) GENERATING DATA MODELS

(75) Inventor: Lucas Zdzislaw Hryniewicki, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 12/913,814

(22) Filed: Oct. 28, 2010

(65) Prior Publication Data

US 2012/0110021 A1  May 3, 2012

(51) Int. Cl.
G06F 17/30 (2006.01)

(52) U.S. Cl.
USPC ............................................. 707/804

(58) Field of Classification Search
USPC ............................................ 707/803, 804
See application file for complete search history.

(56) References Cited

U.S. PATENT DOCUMENTS

| | | | |
|---|---|---|---|
| 6,253,199 B1* | 6/2001 | Wakio et al. | 1/1 |
| 6,490,590 B1 | 12/2002 | Fink | |
| 7,257,597 B1* | 8/2007 | Pryce et al. | 1/1 |
| 7,313,561 B2* | 12/2007 | Lo et al. | 1/1 |
| 7,664,729 B2* | 2/2010 | Klein et al. | 707/791 |
| 7,895,191 B2* | 2/2011 | Colossi et al. | 707/717 |
| 7,933,756 B2* | 4/2011 | Bassi et al. | 703/7 |
| 8,200,620 B2* | 6/2012 | Akiyama et al. | 707/609 |
| 8,271,103 B2* | 9/2012 | Hendler et al. | 700/31 |
| 2002/0049749 A1* | 4/2002 | Helgeson et al. | 707/3 |
| 2002/0161778 A1 | 10/2002 | Linstedt | |
| 2003/0154191 A1 | 8/2003 | Fish et al. | |
| 2003/0195879 A1* | 10/2003 | Pereymer et al. | 707/4 |
| 2003/0233347 A1* | 12/2003 | Weinberg et al. | 707/3 |
| 2005/0203942 A1 | 9/2005 | Sundararajan et al. | |
| 2006/0064425 A1* | 3/2006 | Kakivaya et al. | 707/100 |
| 2006/0112109 A1 | 5/2006 | Chowdhary et al. | |
| 2006/0224371 A1* | 10/2006 | Lee et al. | 703/11 |
| 2006/0282470 A1* | 12/2006 | Yu et al. | 707/200 |
| 2007/0130180 A1* | 6/2007 | Rasmussen | 707/100 |
| 2008/0046462 A1* | 2/2008 | Kaufman et al. | 707/102 |
| 2008/0140696 A1* | 6/2008 | Mathuria | 707/102 |
| 2008/0162399 A1* | 7/2008 | Tam et al. | 706/59 |

OTHER PUBLICATIONS

Linstedt, Dean E., "Data Vault Series 2—Data Vault Components", Retrieved at << http://www.tdan.com/view-articles/5155/ >>, Jan. 1, 2003, pp. 6.

English, Larry, "The Logical to Physical Data Model Transformation" Retrieved at << http://wilshireconferences.com/MD2003/tutorials.htm >>, Dec. 27, 2002, pp. 9.

Haughey, Tom, "Transforming a Logical Data Model to a Physical Database Design—an Overview" Retrieved at << http://www.tdan.com/view-featured-columns/5389 >>, Feb. 1, 2006, pp. 5.

Dlinstedt, "About the Data Vault", Retrieved at <<http://danlinstedt.com/2010/04/about-the-data-vault/>>, Aug. 4, 2010, pp. 10.

* cited by examiner

*Primary Examiner* — Jorge A Casanova (57) ABSTRACT

Aspects of the subject matter described herein relate to data models. In aspects, data representing a source data model is obtained. Settings for use in generating a destination data model are also obtained. Based on the data and the settings, data representing a destination data model is generated by transforming entities of the source data model into entities of the destination data model according to the settings.

20 Claims, 6 Drawing Sheets

GENERATING DATA MODELS

BACKGROUND

Most large data projects are built incrementally. For example, with an enterprise data warehouse project, there may be multiple changes to data models over time. Unfortunately, the changes may have a ripple effect on code and consumers who already reference a previous version of the data model.

To deal with this, developers sometimes use a data model that is more resilient to changes. In such a data model, changes may be made to the data model without breaking existing code. Unfortunately, such models may be hard to understand, difficult to validate, and difficult to update for new changes.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to generating data models. In aspects, data representing a source data model is obtained. Settings for use in generating a destination data model are also obtained. Based on the data and the settings, data representing a destination data model is generated by transforming entities of the source data model into entities of the destination data model according to the settings.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Headings are for convenience only; information on a given topic may be found outside the section whose heading indicates that topic.

Other definitions, explicit and implicit, may be included below.

Exemplary Operating Environment

Figure 1:
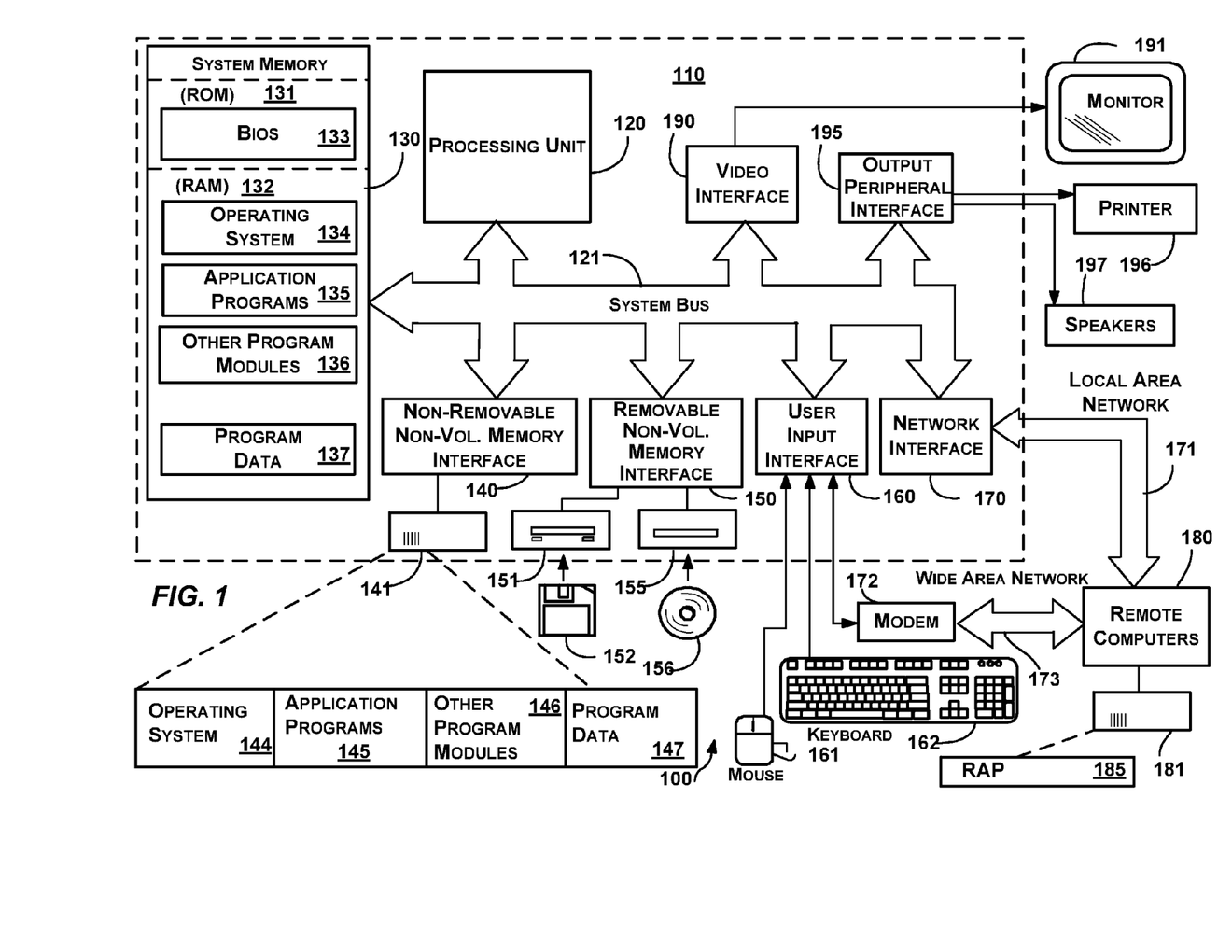
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Generating Data Models

As mentioned previously, data models that are resilient to change may have other issues.

Figure 2:
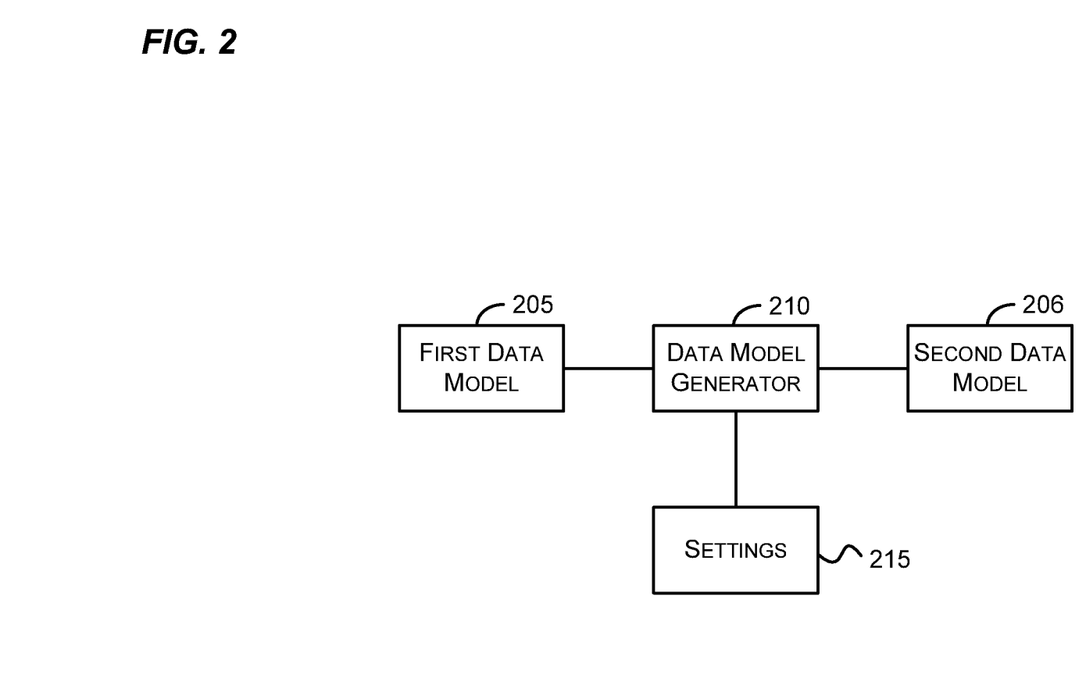
FIGS. 2-3 are block diagrams that include exemplary systems in accordance with aspects of the subject matter described herein.
Figure 3:
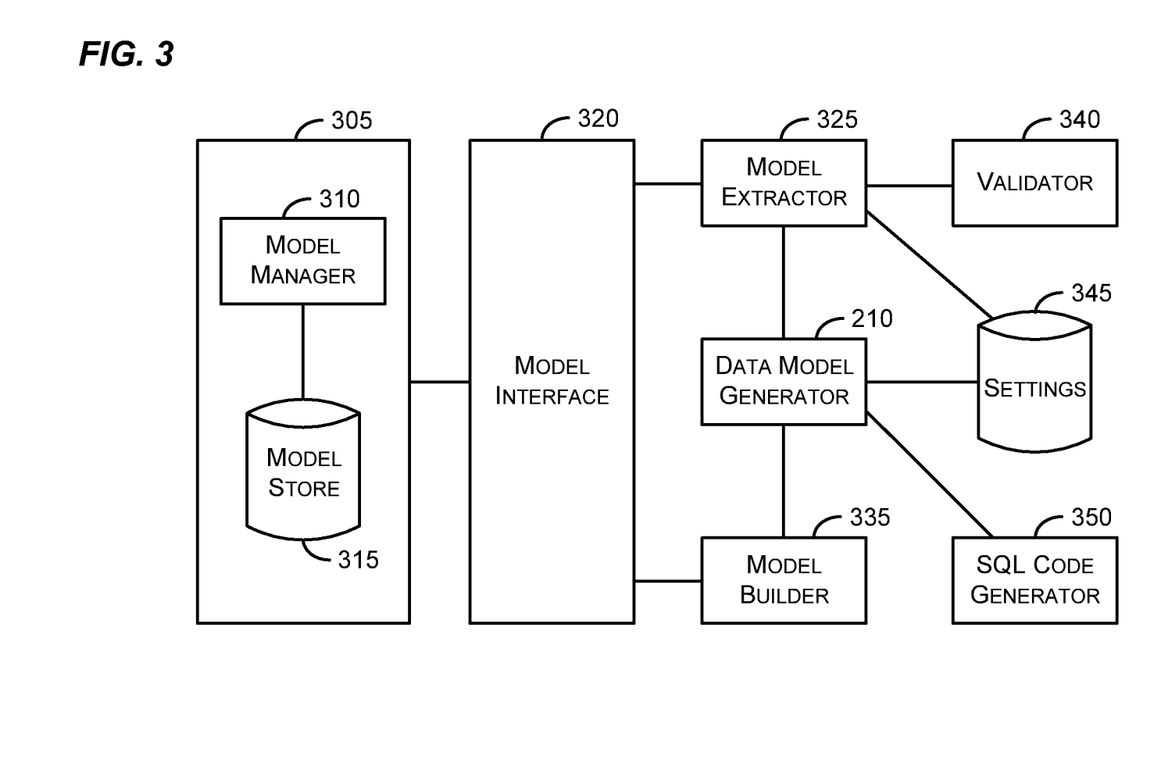

FIGS. 2-3 are block diagrams that include exemplary systems in accordance with aspects of the subject matter described herein. The components illustrated in FIGS. 2-3 are exemplary and are not meant to be all-inclusive of components that may be needed or included in an implementation. In other embodiments, one or more of the components described in conjunction with FIG. 2-3 may be included in other components (shown or not shown) or divided into other components without departing from the spirit or scope of aspects of the subject matter described herein. In some embodiments, the components described in conjunction with FIG. 2-3 may be distributed across multiple devices.

One or more of the components may be implemented using one or more computers (e.g., the computer 110 of FIG. 1) and storage devices associated therewith. The various components may be reachable via various networks including intra- and inter-office networks, one or more local area networks, wide area networks, direct connections, virtual connections, private networks, virtual private networks, some combination of the above, and the like.

As used herein, the term component is to be read to include hardware such as all or a portion of a device, a collection of one or more software modules or portions thereof, some combination of one or more software modules or portions thereof and one or more devices or portions thereof, and the like.

Turning to FIG. 2, the first data model 205 may represent a physical or logical data model. A data model may describe entities and the relationships between entities independent of any associated process. A data model may include metadata that provides additional information regarding a data model.

An entity may be defined by its attributes. For example, a person may be defined by first name, last name, date of birth, and other attributes. One or more attributes may form a key—something that can be used to identify a particular entity. For example, first name, middle name, last name, and date of birth may be enough information to form a key that can be used to identify a person.

In some database systems, a different integer is assigned to each entity. For example, a different employee identifier may be assigned to each employee of an organization. As another example, a different position identifier may be assigned to each position of an organization. This identifier may be used as a key to identify a particular entity within a table of a database.

When two or more keys may be used to identify a particular entity, one of the keys may be assigned as a primary key while the other keys may be assigned as alternate keys.

Attributes about entities are often represented by tables. A table may have fields that represent the different attributes of an entity. Each row of the table may represent attributes about a single entity. A table may also be used to represent a relationship between two or more entities. For example, by having a field for a key of each of the entities, a table may represent relationships between the entities.

Figure 4:
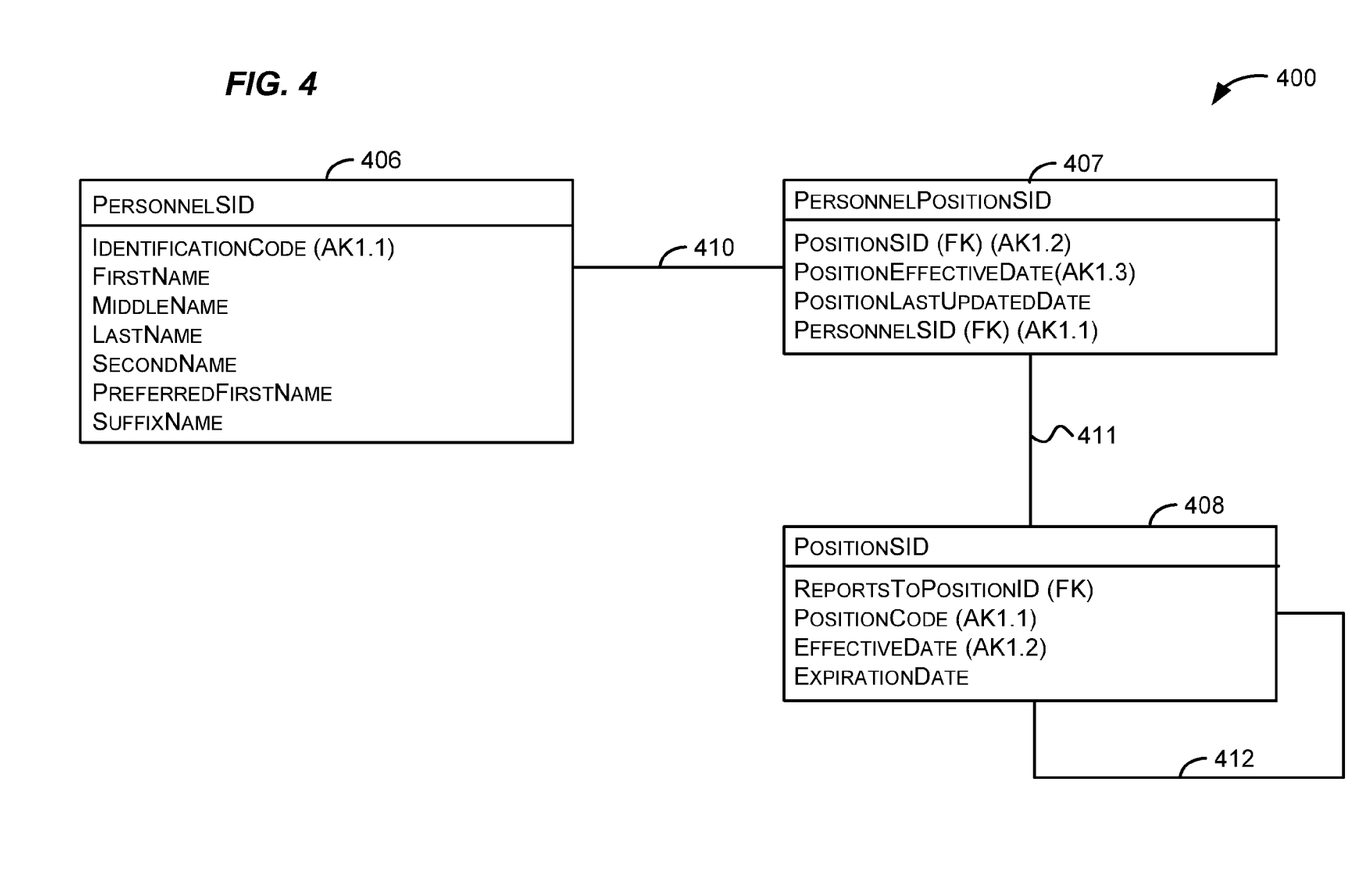
FIG. 4 is an exemplary data model in accordance with aspects of the subject matter described herein.

FIG. 4 is an exemplary data model in accordance with aspects of the subject matter described herein. The data model 400 includes a personnel entity 406, a position entity 408, and a mapping entity 407. The personnel entity 406 includes attributes for representing people. For example, a person may have a first name, a middle name, a last name, a second name, a preferred name, a suffix, and the like.

The position entity 408 includes attributes of a position such as a position in an organization. These attributes may include, for example, an identifier of a supervisor (e.g., the ReportsToPositionID attribute), a code of the position, an effective date of the position, and an expiration date of the position.

The mapping entity 407 may include attributes for associating the position entity 408 with the personnel entity 406. For example, the mapping entity 407 may include an attribute for a key of the personnel entity 406 together with an attribute for a key of the position entity 408. Having the two attributes allows the mapping entity 407 to describe a relationship between the personnel entity 406 and the position entity 408.

The line 410 illustrates that the personnel entity 406 is related to the mapping entity 407. This relationship may be captured by the PersonnelSID attribute of the mapping entity 407. The PersonnelSID attribute is a foreign key that maps to a corresponding PersonnelSID attribute of the personnel entity 406.

Likewise, the line 411 illustrates that the mapping entity 407 is related to the position entity 408. This relationship may be captured via the PositionSID attribute of the mapping entity 407. The PositionSID attribute is a foreign key that maps to a corresponding PositionSID attribute of the position entity 408.

The line 412 indicates a relationship that the position entity 408 has with itself. The position entity 408 may include a relationship attribute that relates positions. This may be used, for example, to capture relationship data that indicates that a person may report to another person and may have other people that report to him or her.

The entities 406-408 may be represented as tables that have fields corresponding to the attributes of the entities. Thus the personnel entity 406 may sometimes be referred to as a personnel table, while the mapping entity 407 may sometimes be referred to as a mapping table.

When the data model does not specify how to implement a database, the data model is said to be a logical data model. For example, if a data model indicates entities and relationships between entities without specifying how to implement a database, the data model is said to be a logical data model.

As known to those skilled in the art, data may be organized according to various normal forms including first normal form, second normal form, third normal form, fourth normal form, and fifth normal form. A logical data model will often be organized according to the third normal form or higher.

The data model illustrated in FIG. 4 is an example of a logical data model in part because it does not specify how to implement a database. A physical data model may be derived from the data model of FIG. 4. Such a physical data model may then be used to implement the database.

A database may comprise a relational database, an object-oriented database, a hierarchical database, a network database, another type of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

Returning to FIG. 2, the second data model 206 may represent a physical data model. For example, the second data model may represent a Data Vault or other physical data model.

The data model generator 210 is a component that obtains first data that represents the first data model 205 and generates second data representing the second data model 206 based on the first data and the settings 215.

To do this, the data model generator 210 may locate relationships between tables of the first data model 205 and may then create data that represents tables of the second data model. An exemplary process for doing this for two tables is described below with reference to FIG. 5.

Figure 5:
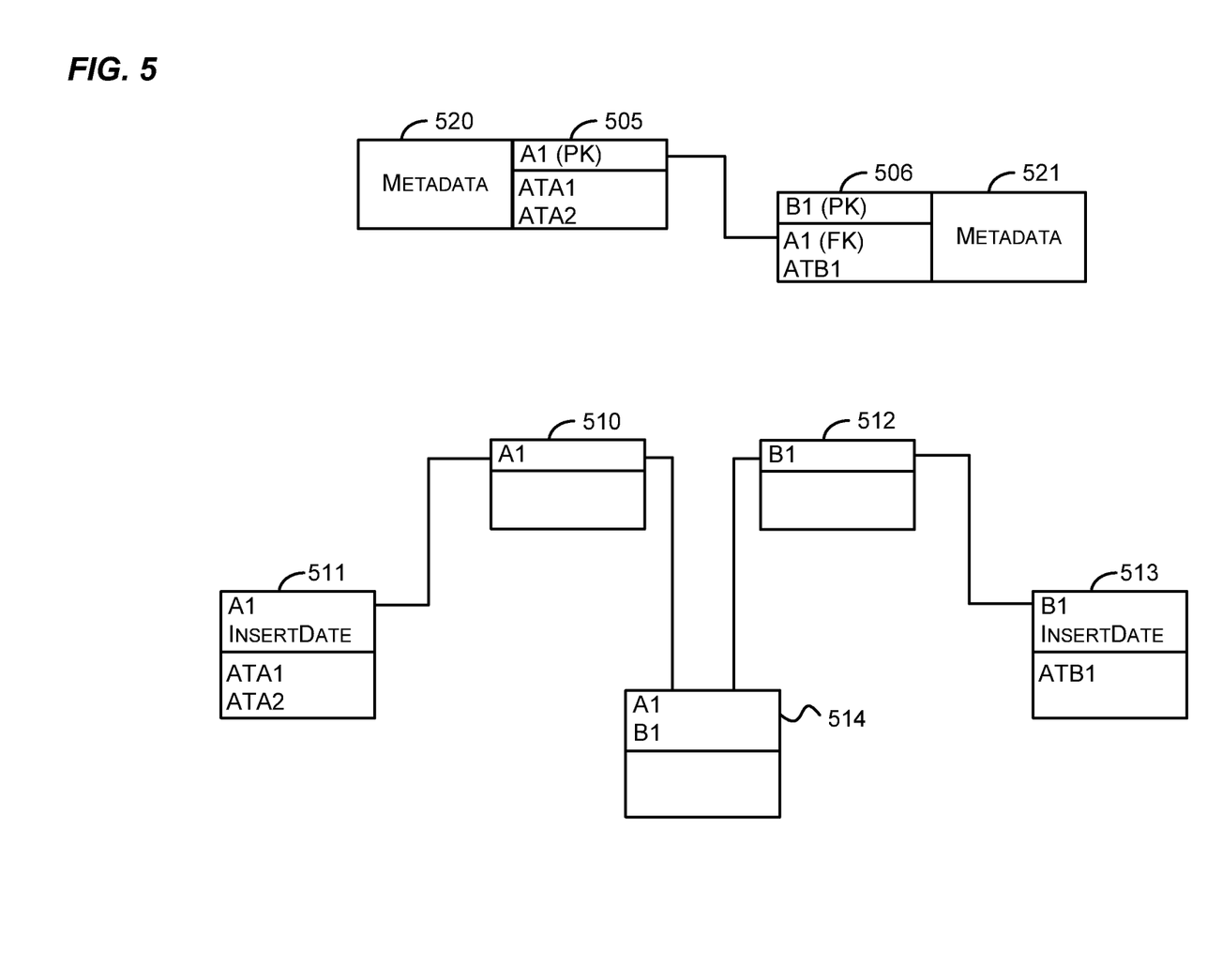
FIG. 5 illustrates an exemplary transformation between a first data model and a second data model in accordance with aspects of the subject matter described herein.

Turning to FIG. 5, illustrated are two tables 505-506. Table 505 includes a primary key A1 and two attributes: ATA1 and ATA2. Table 506 includes a primary key B1, a foreign key A1, and an attribute ATB1. The tables 505 and 506 and the relationship between the tables may represent a logical data model.

To create a physical data model from the tables 505-506, the following actions may be performed. As one action, a table 510 is created. The primary key A1 of the table 505 is placed in the table 510.

In addition, additional maintenance attributes (not shown) may be included in the table 510. These additional maintenance attributes may include, for example, a source system identifier (e.g., a number that identifies a data source that represents a particular data source of an organization), an inserted date (e.g., a system generated date/time that indicates when a record was inserted), a IsDeletedFlag (e.g., an indicator used to mark deleted records), a IsSuspectFlag (e.g., an indicator used to mark a "suspect" record such as a child record that has no corresponding parent record. This indicator may be used, for example, by verification/reload logic in parallel data loading.), a first inserted date (e.g., the date at which a relationship was first established), a retirement date (e.g., a date at which a relationship was terminated), and other maintenance attributes. These maintenance attributes may be used to provide the ability to keep historical data (e.g., used for point in time queries, change data tracking, and the like), to version a data schema, and the like.

The maintenance attributes that are included in a table may be assigned by table type. For example, a user interface may show a grid interface that allows a user to specify the maintenance attributes to include for hub, satellite, link, and other tables generated by a data model generator. These settings may be stored in the settings 215 of FIG. 2.

The other attributes of the table 505 are placed in a separate table 511 (sometimes called a satellite table). The primary key A1 of the table 510 is also placed in the table 511 to associate the two tables together. In addition, a date attribute (InsertDate) may be placed in the primary key of the table 511 to indicate a date at which a relationship was created between the table 510 and the table 511.

Likewise, tables 512-513 are created. The primary key B1 of the table 506 is placed in the table 512. The attribute ATB1 of the table 506 is placed in the table 513. The primary key B1 of the table 506 is also placed in the table 513 to associate the two tables together. In addition, a date attribute (InsertDate) is placed in the primary key of the table 513 to indicate a date at which a relationship was created between the table 512 and the table 513.

In addition, a table 514 is created. The table 514 is a link table that associates the table 510 with the table 512. The table 514 includes as a primary key the attributes A1 and B1.

The tables 510 and 512 are sometimes referred to as hub tables while the tables 511 and 513 are sometimes referred to as satellite table.

Creating a table may include creating data that represents the table (e.g., via the data model generator 210 of FIG. 2), creating model data that represents the table (e.g., by interfacing with a model manager 310 via the modeling interface 320 of FIG. 3), creating file data the represents a table, creating a table in a database (e.g., via one or more SQL instructions), or the like.

Returning to FIG. 2, the settings 215 may indicate how the data model generator 210 is to generate the second data model 206. For example, the settings 215 may indicate what to use for a primary key in a hub table. For example, referring to FIG. 5, the settings may indicate that the primary key A1 of the table 505 is to be used as the primary key A1 of the table 510.

The primary key A1 of the table 505 may not be ideal to be a primary key of the table 510. For example, if A1 is not a sequential number (such as an integer), A1 may not be ideal to use as the primary key of the table 510. In that case, the settings 215 may further indicate whether A1 is to be used anyways or whether a new primary key is to be generated for the table 510. In the latter case, a new primary key may be generated for the table 510 and the primary key A1 of the table 505 may be added as an attribute of the table 510.

The settings 215 may indicate whether alternate keys (if any) in the original table are to be inserted into a hub table. For example, if the table 505 includes one or more alternate keys, the settings 215 may indicate which of the alternate keys are to be placed in the table 510. For example, the settings 215 may indicate to place the first alternate key, the second alternate key, the last alternate key, a set of alternate keys, all of the alternate keys, or the like into the table 510 during generation.

The data model generator 210 may place any attributes that are not included in the hub table into one or more satellite tables. The data model generator 210 may determine to do this based on metadata associated with a table. For example, metadata 520 associated with attributes of the table 505 may indicate one or more satellite tables into which the attributes ATA1 and ATA2 are to be placed. For example, each attribute of the table 505 may be associated with metadata that indicates a satellite table into which the attribute is to be placed.

If the metadata 520 does not indicate a satellite table into which to put an attribute, the attribute may be placed in a single satellite table with other attributes for which metadata does not indicate a satellite table. For example, if the attributes ATA1 and ATA2 do not have metadata that indicates satellite tables, both ATA1 and ATA2 may be placed in the satellite table 511.

Configuration settings similar to the metadata 520 may be stored in the metadata 521.

In addition, configuration settings included in metadata may specify a name of a hub and/or satellite table. In generating a hub or satellite table, the data model generator 210 may obtain one or more names from the metadata and create hub and satellite tables based on the names.

The settings 215 may specify a suffix to append to a name of a hub table. For example, if the table 505 is named Employee, a setting may allow a user to indicate a suffix to add to Employee when creating the hub table 510. Similarly, the settings 215 may specify a suffix to append to a name of a satellite table.

Generated tables may be grouped by type. For example, the generated tables may include hub tables, satellite tables, link tables, and the like. The settings 215 may specify a naming convention associated with a specific type. A naming convention may then be followed when generating a table of a specified type.

In addition, the settings 215 may specify a color associated with a specific type. For example, the settings 215 may specify that hub tables are to be displayed in red, satellite tables are to be displayed in yellow, and link tables are to be displayed in green. Based on these settings, the data model generator 210 may generate a data model with colors encoded in the data model (or metadata thereof) so that when the data model is viewed in a modeling tool, the tables are displayed in the encoded colors.

Color settings for the settings 215 may also be specified as metadata associated with a table or data model. In this case, the data model generator 210 may encode the colors specified by the metadata or replace the colors with other color settings specified in the settings 215.

The data model generator 210 may be able to generate SQL code in addition to creating the second data model 206. The SQL code may abstract a physical data model generated by the data model generator 210 and allow a user to reference objects in the generated model as the objects were defined in the initial (source) data model. Whether the data model generator 210 generates SQL code may be specified in a setting of the settings 215.

To create a link table such as the table 514, the data model generator 210 may iterate over the attributes of the table 506 and determine that the table 506 is a child of the table 505. This is indicated by the foreign key A1 of the table 506. Using this data, the data model generator 210 may find the parent table 505. The data model generator 210 may then place keys (A1 and B1) for the tables 505 and 506 into the link table 514. If a table includes additional foreign keys, these foreign keys may also be placed in the link table 514.

Turning to FIG. 3, the data model generator 210 is illustrated together with a modeling environment 305, a model interface 320, a model extractor 325, a model builder 335, a validator 340, a settings repository 345, and an SQL cod generator 350.

The modeling environment 305 includes a model manager 310 and a model store 315. The model manager 310 may include a modeling tool that allows a user to design data models using a graphical user interface. Data regarding the data models may be stored in the model store 315.

The model store 315 may comprise any storage media capable of storing data. For example, the model store 315 may comprise volatile memory such as RAM, non-volatile memory such as a hard disk, other storage media described in conjunction with FIG. 1, other storage, some combination of the above, and the like and may be distributed across multiple devices.

The term data may include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like.

The model interface 320 may interface with the model manager 310 and/or the model store 315. The model interface 320 may provide a set of application programming interfaces (APIs) that allow the model extractor 325 to obtain data models from the model manager 310 and/or the model store 315. Likewise the model interface 320 may provide a set of APIs that allow the model builder 335 to create a data model using the model manager 310 and/or to create a file that represents a data model using the model store 315.

The model extractor 325 may be operable to obtain data that represents a data model using the model interface 320. As mentioned above, this data may come by interfacing with the model manager 310 and/or by obtaining data directly from the model store 315. The model extractor 325 may also obtain metadata regarding a data model. The model extractor 325 may pass this metadata to the data model generator 210 or may update settings in the settings repository 345 to reflect the metadata obtained in the data model.

A data model that has been obtained by the model extractor 325 may be passed through the validator 340. The validator 340 may determine whether the data conforms (e.g., complies with or is formatted according to) a database normal form (e.g., third normal form). The validator 340 may generate a report that indicates whether the data model conforms and, if not, what is wrong with the data model.

The data model generator 210 may retrieve settings from the settings repository 345. If the model extractor 325 also placed settings corresponding to the metadata found in the data model, the data model generator 210 may also obtain these settings from the settings repository 345. Otherwise, the data model generator 210 may obtain the metadata from the model extractor 325.

The data model generator 210 may generate data that represents a second data model by performing actions, including:

1. Creating first hub data that includes a first key and maintenance data of the first hub data. For example, referring to FIG. 5, data representing the table 510 may be created. The table 510 may be created with maintenance attributes.

2. Creating second hub data that includes a second key and maintenance data of the second hub attributes. For example, referring to FIG. 2, data representing the table 512 may be created. The table 512 may also be created with maintenance attributes.

3. Creating link data that includes the first key and the second key. For example, referring to FIG. 2, the table 514 may be created that links the table 510 and 512 based on the keys A1 and B1.

In addition, other tables including satellite tables may also be created as previously indicated. The actions above may be performed several times for sets of related tables in the source data model.

The model builder 335 may then use the output data from the data model generator 210 to create a second model. For example, the model builder 335 may interface with the model manager 310 using the model interface 320. For example, the model builder 335 may interact with an interface that allows the model builder 335 to access objects of the model manager 310. Using these objects, the model builder 335 may create the second model.

As another example, the model builder 335 may create a file that encodes the second model in a manner suitable for reading by the model manager 310. For example, if the syntax that the model manager 310 uses for storing models is known, the model builder 335 may create a file that encodes the second model using the syntax.

The structured query language (SQL) generator 350 may create database instructions for viewing data stored according to the second model in terms of the first model. For example, when converting from a logical data model to a physical data model, more tables may be created. The SQL generator 350 may create a query that allows the data in the physical data model to be viewed in terms of the logical data model.

In generating a data model, the data model generator 210 may obtain (e.g., retrieve) settings from the settings repository 345. For example, a retrieved setting may indicate whether a key for a table from a source data model is to be used as the key in a table for the destination data model. The data model generator 210 may also be operable to determine whether the key of the source table is ideal (e.g., a sequential integer) for use as the key in the destination table.

Figure 6:
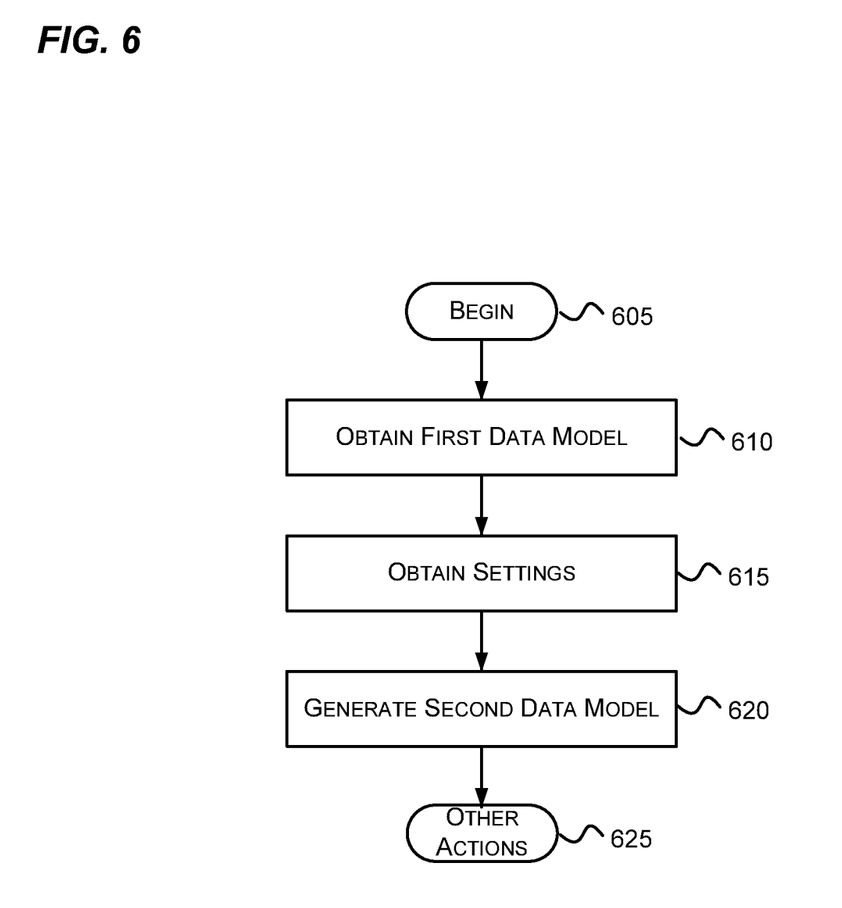
FIG. 6 is a flow diagram that generally represents exemplary actions that may occur in accordance with aspects of the subject matter described herein

FIG. 6 is a flow diagram that generally represents exemplary actions that may occur in accordance with aspects of the subject matter described herein. For simplicity of explanation, the methodology described in conjunction with FIG. 6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 6, at block 605, the actions begin. At block 610, data representing a first data model is obtained. For example, referring to FIG. 3, the data model generator 210 may obtain data representing a first data model from the model extractor 325. The first data model indicates a relationship between a first table and a second table. Indicating a relationship between a first and a second table does not necessarily mean that the first data model only indicates a relationship between the first and second tables. Indeed, the first data model may also indicate relationships between other tables.

The first data model may represent a logical data model, a physical data model, or some combination of a logical and physical data model.

At block 615, configurable settings for creating a second data model are obtained. For example, referring to FIG. 3, the data model generator 210 may obtain settings from the settings repository 345. The data model generator 210 may also obtain metadata from the model provided by the model extractor 325. Configurable as used here indicates that the settings may be modified by a user, process, or other entity.

At block 620, second data is generated that represents a second data model. The second data is generated based on the first data and the configurable settings. For example, referring to FIG. 3, the data model generator 210 may generate second data based on the first data obtained from the model extractor 325 and settings of settings repository 345. The data model generator 210 may pass this second data to the model builder 335 and the SQL code generator 350. The data model generator 210 may generate the second data by performing actions, including:

1. Creating first hub data that includes a first key and maintenance attributes of the first hub data. The first hub data corresponds to the first table. For example, referring to FIG. 5, data corresponding to the table 510 may be created. Attributes of the table 510 may include maintenance attributes. Attributes of the table 510 may also include an alternate key of the first table.

2. Creating second hub data that includes a second key and maintenance data of the second hub data. The second hub data corresponds to the second table. For example, referring to FIG. 5, data corresponding to the table 512 may be created. Attributes of the table 512 may include maintenance attributes.

3. Creating link data that includes the first key and the second key. For example, referring to FIG. 5, data corresponding to the table 514 may be created.

At block 625, other actions, if any, may be performed. Other actions may include, for example, naming one or more of the tables based on the configurable settings. For example, settings may indicate a suffix or other naming convention with which to name one or more tables.

Another action that may occur is creating satellite data for the first table. The satellite data includes an attribute of the first table and a key that references the first hub data.

Another action that may occur is creating satellite data for the second table. This satellite data includes an attribute of the second table and a key that references the second hub data.

As can be seen from the foregoing detailed description, aspects have been described related to generating data models. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   obtaining first data that represents a first data model, the first data model indicating a relationship between a first table and a second table;
   obtaining configurable settings for creating a second data model from the first data model;
   based on the first data and the configurable settings, generating second data that represents the second data model, by performing actions, comprising:
      creating first hub data that includes a first key and maintenance attributes of the first hub data, the first hub data corresponding to the first table;
      creating second hub data that includes a second key and maintenance data of the second hub data, the second hub data corresponding to the second table; and
      creating link data that includes the first key and the second key.

2. The method of claim 1, further comprising creating first satellite data that includes an attribute of the first table and that also includes a key that references the first hub data.

3. The method of claim 1, further comprising creating second satellite data that includes an attribute of the second table and that also includes a key that references the second hub data.

4. The method of claim 1, wherein obtaining first data that represents a first data model comprises obtaining data that represents a logical data model and wherein generating second data that represents a second data model comprises generating data that represents a physical data model.

5. The method of claim 1, wherein obtaining first data that represents a first data model comprises obtaining data that represents a first physical model and wherein generating second data that represents a second data model comprises generating data that represents a second physical data model.

6. The method of claim 1, wherein creating first hub data that includes a first key and maintenance data of the first hub data comprises creating first hub data that also includes an alternate key of the first table.

7. The method of claim 1, wherein creating first hub data that includes a first key comprises obtaining a configuration setting that indicates that a table attribute of the first table is to be used as the first key and determining whether the table attribute is ideal to use as the first key.

8. The method of claim 7, wherein determining whether the table attribute is ideal to use as the first key comprises determining whether the table attribute includes sequential numbers that are capable of acting as a primary key of the first table.

9. The method of claim 1, wherein generating second data that represents a second data model further comprises setting a name of a table represented by the first hub data based on a name included in the configurable settings.

10. The method of claim 1, wherein generating second data that represents a second data model further comprises encoding a color in the second data with which a table represented by the first hub data is to be displayed based on a color indicated in the configurable settings.

11. The method of claim 1, wherein creating first hub data that includes a first key and maintenance data of the first hub data comprises placing data that indicates an inserted date in the first hub data.

12. In a computing environment, a system, comprising:
a model extractor to obtain first data that represents a first data model, the first data model indicating a relationship between a first table and a second table;
a settings repository to store settings for use in generating a second data model from the first data model;
a data model generator, implemented using a processing unit, to retrieve the settings and to generate second data that represents the second data model by performing actions, including:
creating first hub data that includes a first key and maintenance data of the first hub data,
creating second hub data that includes a second key and maintenance data of the second hub data, and
creating link data that includes the first key and the second key; and
a model builder to use the second data to create the second data model.

13. The system of claim 12, further comprising a validator to determine whether the first data conforms to a database normal form.

14. The system of claim 12, further comprising a code generator to create database instructions for viewing data stored according to the second data model in terms of the first data model.

15. The system of claim 12, wherein the data model generator creates the first hub data that includes a first key by retrieving a setting from the settings repository, the setting indicating whether a key of the first table is to be used as the first key.

16. The system of claim 15, wherein the data model generator determines whether the key of the first table is ideal for use as the first key.

17. The system of claim 12, wherein the model builder uses the second data to create the second data model by interfacing with a model manager via an interface that allows the model builder to access objects of the model manager.

18. The system of claim 12, wherein the model builder uses the second data to create the second data model by creating a file that encodes the second data model in a manner suitable for reading by a modeling tool.

19. A computer storage device having computer-executable instructions, which when executed perform actions, comprising:
obtaining a first data model, the first data model indicating a relationship between a first table and a second table;
obtaining a configurable setting for use in generating a second data model from the first data model; and
based on the first data and the configurable setting, generating a second data model by performing actions, comprising:
creating a first hub table that includes a first primary key and a first alternate key, the first alternate key obtained from the first table;
creating a second hub table that includes a second primary key and an a second alternate key, the second alternate key obtained from the second table;
creating a link data table that includes the first primary key and the second primary key; and
naming the first hub table based on the configurable setting.

20. The computer storage device of claim 19, wherein naming the first hub table based on the configurable setting comprises adding a suffix to a name of the first hub table, the suffix specified by the configurable setting.

* * * * *